(12) United States Patent
Etter et al.

(10) Patent No.: US 9,398,829 B2
(45) Date of Patent: *Jul. 26, 2016

(54) INTEGRATED HEATER FOR A BEVERAGE PREPARATION DEVICE

(71) Applicant: Nestec S.A., Vevey (CH)

(72) Inventors: Stefan Etter, Kehrsatz (CH); Gilles Gavillet, Ursy (CH); Thomas Hodel, Hagendorn (CH); Alexandre Kollep, Lutry (CH); Peter Möri, Walperswil (CH); Renzo Moser, Gümmenen (CH); Peter Preisig, Herisau (CH); Robin Schwab, Bukoba (TZ)

(73) Assignee: Nestec S.A., Vevey (CH)

(*) Notice: Subject to any disclaimer, the term of this patent is extended or adjusted under 35 U.S.C. 154(b) by 292 days.

This patent is subject to a terminal disclaimer.

(21) Appl. No.: 14/065,848

(22) Filed: Oct. 29, 2013

(65) Prior Publication Data

US 2014/0053733 A1 Feb. 27, 2014

Related U.S. Application Data

(62) Division of application No. 12/681,535, filed as application No. PCT/EP2008/063092 on Sep. 30, 2008, now Pat. No. 8,600,223.

(30) Foreign Application Priority Data

Oct. 4, 2007 (EP) .................................... 07117853
Apr. 22, 2008 (EP) .................................... 08154918

(51) Int. Cl.
*A47J 31/00* (2006.01)
*F24H 1/10* (2006.01)
(Continued)

(52) U.S. Cl.
CPC ................. *A47J 31/58* (2013.01); *A47J 31/542* (2013.01); *A47J 31/545* (2013.01); *F24H 1/142* (2013.01);
(Continued)

(58) Field of Classification Search
CPC ........ A47J 31/542; A47J 31/545; A47J 31/36

USPC .............. 99/280, 281, 282, 283, 289 R, 295, 99/302 R; 392/487, 489, 488, 491, 492, 392/479, 465, 478

See application file for complete search history.

(56) References Cited

U.S. PATENT DOCUMENTS

| 1,437,005 A | 11/1922 | Newsom ........................ 219/441 |
| 1,513,685 A | 10/1924 | Ardovino ........................ 99/281 |

(Continued)

FOREIGN PATENT DOCUMENTS

| CA | 2 656 200 A1 | 1/2008 |
| CH | 503 630 A | 2/1971 |

(Continued)

OTHER PUBLICATIONS

International Search Report, Appl. No. PCT/EP2009/053139, Jul. 20, 2009.

(Continued)

*Primary Examiner* — Reginald L Alexander
(74) *Attorney, Agent, or Firm* — K&L Gates LLP (57) ABSTRACT

An in-line heater for a liquid food or beverage preparation machine, in which machine liquid is circulated through the heater and then guided into a brewing chamber for brewing a food or beverage ingredient supplied into said brewing chamber. The heater has a body incorporating an inlet, an outlet and a heating chamber extending therebetween, with the inlet, outlet and heating chamber forming together a rigid passage for guiding the liquid circulating through the body, and one or more electric components that are secured on or in the body and connected to a printed circuit board arranged to control the heater. The one or more electric components are rigidly connected to the printed circuit board.

17 Claims, 5 Drawing Sheets

(51) Int. Cl.

| | | |
|---|---|---|
| *A47J 31/58* | (2006.01) | |
| *A47J 31/54* | (2006.01) | |
| *F24H 1/14* | (2006.01) | |
| *F24H 9/20* | (2006.01) | |
| *H01R 13/11* | (2006.01) | |
| *H01R 12/72* | (2011.01) | |
| *A47J 31/36* | (2006.01) | |

(52) U.S. Cl.
CPC ............ *F24H 9/2028* (2013.01); *H01R 12/728* (2013.01); *H01R 13/111* (2013.01); *A47J 31/36* (2013.01)

(56) References Cited

U.S. PATENT DOCUMENTS

| | | | |
|---|---|---|---|
| 2,514,360 A | 7/1950 | Alvarez | 392/465 |
| 2,715,868 A | 8/1955 | Brown | 99/302 R |
| 3,260,190 A | 7/1966 | Levinson | 99/295 |
| 3,286,618 A | 11/1966 | Barrera | 99/302 R |
| 3,320,572 A | 5/1967 | Schwartz | 439/80 |
| 3,374,979 A | 3/1968 | Coldren et al. | 248/222.12 |
| 3,622,750 A | 11/1971 | Watts, Jr. | 392/407 |
| 3,919,520 A | 11/1975 | Pickard | 219/208 |
| 4,242,568 A | 12/1980 | Wunderlin et al. | 392/397 |
| 4,320,626 A | 3/1982 | Donnelly | 62/3.64 |
| 4,551,611 A | 11/1985 | Longo | 392/451 |
| 4,589,374 A | 5/1986 | Farina | 122/18.31 |
| 4,595,131 A | 6/1986 | Ruskin et al. | 222/640 |
| 4,760,774 A | 8/1988 | Lin | 99/299 |
| 4,871,089 A | 10/1989 | Rader et al. | 222/54 |
| 4,949,627 A | 8/1990 | Nordskog | 99/281 |
| 5,019,690 A | 5/1991 | Knepler | 219/400 |
| 5,063,836 A | 11/1991 | Patel | 99/281 |
| 5,161,455 A | 11/1992 | Anson et al. | 99/280 |
| 5,257,341 A | 10/1993 | Austin, Jr. et al. | 392/487 |
| 5,392,694 A | 2/1995 | Muller et al. | 99/295 |
| 5,531,152 A | 7/1996 | Gardosi | 99/289 R |
| 5,709,574 A | 1/1998 | Bianca et al. | 439/858 |
| 5,755,149 A | 5/1998 | Blanc et al. | 99/289 T |
| 5,776,527 A | 7/1998 | Blanc | 426/77 |
| 5,794,519 A | 8/1998 | Fischer | 99/295 |
| 5,836,236 A | 11/1998 | Rolfes et al. | 99/290 |
| 5,855,161 A | 1/1999 | Cortese | 99/289 P |
| 5,901,636 A | 5/1999 | Witziers et al. | 99/283 |
| 5,943,472 A | 8/1999 | Charles et al. | 392/396 |
| 5,957,033 A | 9/1999 | In-Albon | 99/284 |
| 5,992,298 A | 11/1999 | Illy et al. | 99/281 |
| 6,009,792 A | 1/2000 | Kraan | 99/295 |
| 6,025,000 A | 2/2000 | Fond et al. | 426/433 |
| 6,026,732 A | 2/2000 | Kollep et al. | 99/295 |
| 6,032,481 A | 3/2000 | Mosby | 62/457.2 |
| 6,035,762 A | 3/2000 | Ruckstuhl | 99/295 |
| 6,036,530 A | 3/2000 | Edwards et al. | 439/455 |
| 6,062,732 A | 5/2000 | Scott | 383/24 |
| 6,098,525 A | 8/2000 | Gijzel et al. | 99/295 |
| 6,389,226 B1 | 5/2002 | Neale et al. | 392/485 |
| 6,393,967 B2 | 5/2002 | Fischer | 99/285 |
| 6,453,800 B1 | 9/2002 | Chen | 99/289 R |
| 6,487,919 B1 | 12/2002 | Edwards | 73/861.77 |
| 6,554,588 B1 | 4/2003 | DiBenedetto | 417/417 |
| 6,698,332 B2 | 3/2004 | Kollep et al. | 99/289 R |
| 6,748,850 B1 | 6/2004 | Kraan | 99/289 R |
| 6,889,598 B2 | 5/2005 | Wroblewski | 99/275 |
| 6,952,524 B2 * | 10/2005 | Bissonnette | B60S 1/488 137/334 |
| 6,954,973 B2 | 10/2005 | Zirbs | 29/407.04 |
| 6,966,251 B2 | 11/2005 | Yoakim | 99/295 |
| 6,994,015 B2 | 2/2006 | Bruinsma | 99/289 R |
| 7,017,474 B2 | 3/2006 | Comte | 99/302 P |
| 7,077,053 B2 | 7/2006 | Kraan | 99/295 |
| 7,131,369 B2 | 11/2006 | Gantt et al. | 99/289 R |
| 7,165,488 B2 | 1/2007 | Bragg et al. | 99/295 |
| 7,231,869 B2 | 6/2007 | Halliday et al. | 99/289 R |
| 7,286,752 B2 | 10/2007 | Gourand | 392/479 |
| 7,287,461 B2 | 10/2007 | Halliday et al. | 99/295 |
| 7,316,178 B2 | 1/2008 | Halliday et al. | 99/295 |
| 7,383,763 B2 | 6/2008 | Dijs | 99/295 |
| 7,418,899 B2 | 9/2008 | Halliday et al. | 99/295 |
| 7,444,927 B1 | 11/2008 | Crosville et al. | 99/295 |
| 7,562,618 B2 | 7/2009 | Jarisch et al. | 99/289 R |
| 7,569,243 B2 | 8/2009 | Yoakim et al. | 426/433 |
| 7,703,380 B2 | 4/2010 | Ryser et al. | 99/295 |
| 7,740,511 B2 | 6/2010 | Katano | 439/816 |
| 7,959,090 B2 | 6/2011 | Shank et al. | 239/130 |
| 8,528,467 B2 * | 9/2013 | Magg | A47J 31/542 392/471 |
| 2002/0148357 A1 | 10/2002 | Lazaris et al. | 99/295 |
| 2003/0019367 A1 | 1/2003 | Fogagnolo et al. | 99/330 |
| 2003/0047080 A1 | 3/2003 | Wu | 99/279 |
| 2003/0066431 A1 * | 4/2003 | Fanzutti | A47J 31/36 99/279 |
| 2004/0031394 A1 | 2/2004 | Yoakim et al. | 99/279 |
| 2004/0101293 A1 | 5/2004 | Bissonnette et al. | 392/484 |
| 2004/0250686 A1 | 12/2004 | Hale | 99/295 |
| 2004/0264951 A1 | 12/2004 | Kuebler et al. | 392/485 |
| 2005/0106288 A1 | 5/2005 | Blanc et al. | 426/77 |
| 2005/0107919 A1 | 5/2005 | Watanabe et al. | 700/245 |
| 2005/0160917 A1 | 7/2005 | Gantt et al. | 99/279 |
| 2005/0183578 A1 | 8/2005 | Mandralis et al. | 99/279 |
| 2005/0235834 A1 | 10/2005 | Blanc et al. | 99/279 |
| 2006/0102008 A1 | 5/2006 | Lin | 99/279 |
| 2007/0012685 A1 | 1/2007 | Gourand | 219/628 |
| 2007/0044664 A1 | 3/2007 | Wang | 99/279 |
| 2007/0104837 A1 | 5/2007 | Yoakim et al. | 426/77 |
| 2008/0006159 A1 | 1/2008 | Fischer | 99/289 R |
| 2008/0028947 A1 | 2/2008 | Magg et al. | 99/288 |
| 2008/0090473 A1 | 4/2008 | Katano | 439/816 |
| 2008/0203870 A1 | 8/2008 | Riley et al. | 312/265.6 |
| 2008/0236403 A1 | 10/2008 | Cortese | 99/323 |
| 2008/0273868 A1 | 11/2008 | Boussemart et al. | 392/479 |
| 2009/0154909 A1 | 6/2009 | Meyer | 392/473 |
| 2009/0205503 A1 | 8/2009 | Cortese | 99/295 |
| 2009/0249961 A1 | 10/2009 | Cheng | 99/289 R |
| 2009/0308259 A1 | 12/2009 | Hiron | 99/323.3 |
| 2010/0011965 A1 | 1/2010 | Turi | 99/289 R |
| 2010/0071563 A1 | 3/2010 | Ryser et al. | 99/295 |
| 2010/0101428 A1 | 4/2010 | Fin | 99/295 |
| 2010/0173053 A1 | 7/2010 | Ryser et al. | 426/431 |
| 2010/0206177 A1 | 8/2010 | Ricotti | 99/295 |
| 2010/0218684 A1 | 9/2010 | Etter et al. | 99/288 |
| 2010/0224077 A1 | 9/2010 | Jing | 99/295 |
| 2010/0282090 A1 | 11/2010 | Etter et al. | 99/288 |
| 2010/0288132 A1 | 11/2010 | Gavillet et al. | 99/295 |
| 2011/0000377 A1 | 1/2011 | Favre | 99/289 R |
| 2011/0041696 A1 | 2/2011 | Aemisegger et al. | 99/281 |
| 2011/0126717 A1 | 6/2011 | Gavillet et al. | 99/288 |

FOREIGN PATENT DOCUMENTS

| | | |
|---|---|---|
| CH | 593 044 A5 | 11/1977 |
| CH | 682 798 A5 | 11/1993 |
| CN | 1137742 A | 12/1996 |
| CN | 1476304 A | 2/2004 |
| CN | 1905827 A | 1/2007 |
| CN | 1919121 A | 2/2007 |
| CN | 101073470 A | 11/2007 |
| CN | 101162809 A | 4/2008 |
| DE | 15 90 068 A1 | 4/1970 |
| DE | 20 19 445 A1 | 11/1971 |
| DE | 196 47 039 C2 | 7/1997 |
| DE | 197 37 694 C1 | 10/1998 |
| DE | 197 32 414 A1 | 2/1999 |
| DE | 103 22 034 A1 | 12/2004 |
| EP | 0 387 515 A1 | 9/1990 |
| EP | 0 485 211 B1 | 5/1992 |
| EP | 0 512 142 A1 | 11/1992 |
| EP | 0 512 148 A1 | 11/1992 |
| EP | 0 602 203 B1 | 6/1994 |
| EP | 0 604 615 A1 | 7/1994 |
| EP | 0 730 425 B1 | 9/1996 |
| EP | 0 761 150 A1 | 3/1997 |
| EP | 0 784 955 A1 | 7/1997 |
| EP | 0 862 882 B1 | 9/1998 |

(56) References Cited

FOREIGN PATENT DOCUMENTS

| | | |
|---|---|---|
| EP | 0 891 734 A1 | 1/1999 |
| EP | 0 904 717 A1 | 3/1999 |
| EP | 1 050 258 B1 | 11/2000 |
| EP | 1 121 882 A2 | 8/2001 |
| EP | 1 133 010 A1 | 9/2001 |
| EP | 1 153 561 B1 | 11/2001 |
| EP | 1 208 782 B1 | 5/2002 |
| EP | 1 219 217 B1 | 7/2002 |
| EP | 1 253 844 B1 | 11/2002 |
| EP | 1 299 022 B1 | 4/2003 |
| EP | 1 380 243 B1 | 1/2004 |
| EP | 1 480 540 B1 | 12/2004 |
| EP | 1 486 150 B1 | 12/2004 |
| EP | 1 495 702 A1 | 1/2005 |
| EP | 1 529 469 A1 | 5/2005 |
| EP | 1 610 596 B1 | 12/2005 |
| EP | 1 635 680 B1 | 3/2006 |
| EP | 1 646 305 B1 | 4/2006 |
| EP | 1 659 547 A1 | 5/2006 |
| EP | 1 669 011 A1 | 6/2006 |
| EP | 1 721 553 B1 | 11/2006 |
| EP | 1 757 212 A2 | 2/2007 |
| EP | 1 774 878 B1 | 4/2007 |
| EP | 1 774 884 A1 | 4/2007 |
| EP | 1 775 234 A1 | 4/2007 |
| EP | 1 776 026 B1 | 4/2007 |
| EP | 1 809 151 B1 | 7/2007 |
| EP | 1 829 469 B1 | 9/2007 |
| EP | 1 859 714 B1 | 11/2007 |
| EP | 1 864 598 A1 | 12/2007 |
| EP | 1 878 368 B1 | 1/2008 |
| EP | 1 893 064 B1 | 3/2008 |
| EP | 2 103 236 A1 | 9/2009 |
| EP | 2 181 629 A1 | 5/2010 |
| EP | 2 218 368 A2 | 8/2010 |
| EP | 2 218 369 A2 | 8/2010 |
| EP | 2 218 370 A2 | 8/2010 |
| EP | 2 374 383 A1 | 10/2011 |
| FR | 1 358 502 A | 4/1964 |
| FR | 2 424 010 A1 | 11/1979 |
| FR | 2 745 995 A1 | 9/1997 |
| FR | 2 799 630 A1 | 4/2001 |
| FR | 2 855 359 A1 | 11/2004 |
| FR | 2 898 734 A1 | 9/2007 |
| FR | 2 904 205 A1 | 2/2008 |
| GB | 847662 A | 9/1960 |
| JP | 1-38493 B2 | 8/1989 |
| JP | 4-34405 B2 | 6/1992 |
| JP | 2002-050726 A | 2/2002 |
| JP | 2003-508102 A | 3/2003 |
| JP | 2003-512117 A | 4/2003 |
| JP | 2004-514488 A | 5/2004 |
| JP | 2004-173823 A | 6/2004 |
| JP | 2005-149216 A | 6/2005 |
| JP | 2006-280208 A | 10/2006 |
| JP | 2007-501506 A | 1/2007 |
| JP | 2007-506474 A | 3/2007 |
| JP | 2007-513697 A | 5/2007 |
| JP | 2009-511102 A | 3/2009 |
| LU | 85316 | 9/1984 |
| TW | 322459 | 12/1997 |
| WO | WO 94/01344 A1 | 1/1994 |
| WO | WO 95/07041 A1 | 3/1995 |
| WO | WO 95/17121 A1 | 6/1995 |
| WO | WO 98/47418 A1 | 10/1998 |
| WO | WO 99/51947 A1 | 10/1999 |
| WO | WO 00/45685 A2 | 8/2000 |
| WO | WO 01/30218 A1 | 5/2001 |
| WO | WO 01/54551 A1 | 8/2001 |
| WO | WO 01/60221 A1 | 8/2001 |
| WO | WO 02/074144 A2 | 9/2002 |
| WO | WO 03/030696 A1 | 4/2003 |
| WO | WO 03/073897 A1 | 9/2003 |
| WO | WO 2004/006742 A1 | 1/2004 |
| WO | WO 2004/069012 A1 | 8/2004 |
| WO | WO 2004/105438 A1 | 12/2004 |
| WO | WO 2005/002405 A2 | 1/2005 |
| WO | WO 2005/004683 A1 | 1/2005 |
| WO | WO 2005/016093 A1 | 2/2005 |
| WO | WO 2005/058111 A1 | 6/2005 |
| WO | WO 2005/060801 A1 | 7/2005 |
| WO | WO 2005/072574 A1 | 8/2005 |
| WO | WO 2005/072586 A1 | 8/2005 |
| WO | WO 2005/099534 A1 | 10/2005 |
| WO | WO 2006/003116 A1 | 1/2006 |
| WO | WO 2006/005736 A2 | 1/2006 |
| WO | WO 2006/005756 A1 | 1/2006 |
| WO | WO 2006/023309 A2 | 3/2006 |
| WO | WO 2006/066626 A1 | 6/2006 |
| WO | WO 2006/104575 A1 | 10/2006 |
| WO | WO 2007/016977 A1 | 2/2007 |
| WO | WO 2007/039683 A1 | 4/2007 |
| WO | WO 2007/111884 A2 | 10/2007 |
| WO | WO 2007/118944 A1 | 10/2007 |
| WO | WO 2007/122144 A1 | 11/2007 |
| WO | WO 2007/135136 A1 | 11/2007 |
| WO | WO 2008/004116 A1 | 1/2008 |
| WO | WO 2008/012316 A2 | 1/2008 |
| WO | WO 2008/014830 A1 | 2/2008 |
| WO | WO 2008/037642 A2 | 4/2008 |
| WO | WO 2008/046740 A1 | 4/2008 |
| WO | WO 2008/154805 A1 | 12/2008 |
| WO | WO 2009/043630 A2 | 4/2009 |
| WO | WO 2009/043851 A2 | 4/2009 |
| WO | WO 2009/043865 A2 | 4/2009 |
| WO | WO 2009/074550 A2 | 6/2009 |
| WO | WO 2009/130099 A1 | 10/2009 |
| WO | WO 2010/015427 A1 | 2/2010 |

OTHER PUBLICATIONS

International Search Report, Appl. No. PCT/EP2009/053368, Oct. 6, 2009.
International Search Report, Appl. No. PCT/EP2008/063128, May 8, 2009.
International Search Report, Appl. No. PCT/EP2008/063092, Jul. 6, 2009.
International Search Report, Appl. No. PCT/EP2008/060463, Apr. 1, 2009.
European Opposition, Appl. No. EP 08802980.0, published evidence, article "Thuis expresso zetten van professionele allure," Door Jaqueline Bosboom, 1 page, Jun. 19, 2004.
European Opposition, Appl. No. EP 08802980.0, published evidence, pictures of prior used Essenza, 13 pages, Dec. 30, 2011.
European Opposition, Appl. No. EP 08802980.0, Magimix Nespresso Essenza Instruction Manual, Essenza Automatic with English translation, 11 pages, Sep. 2004.
U.S. Appl. No. 12/681,535, filed May 28, 2010.
U.S. Appl. No. 12/681,362, filed Apr. 1, 2010.
U.S. Appl. No. 14/038,966, filed Sep. 27, 2013.
U.S. Appl. No. 14/039,320, filed Sep. 27, 2013.
U.S. Appl. No. 14/039,404, filed Sep. 27, 2013.
U.S. Appl. No. 12/681,535, Non-Final Office Action, Mar. 13, 2013.
U.S. Appl. No. 12/681,535, Notice of Allowance, Aug. 5, 2013.
U.S. Appl. No. 12/681,362, Restriction Requirement, Sep. 17, 2012.
U.S. Appl. No. 12/681,362, Non-Final Office Action, Nov. 30, 2012.
U.S. Appl. No. 12/681,362, Notice of Allowance, Jul. 8, 2013.

* cited by examiner

INTEGRATED HEATER FOR A BEVERAGE PREPARATION DEVICE

CROSS-REFERENCE TO RELATED APPLICATIONS

This application is a division of U.S. application Ser. No. 12/681,535 filed on May 28, 2010, now U.S. Pat. No. 8,600,223, which is the 371 national stage entry of International application no. PCT/EP2008/063092 filed on Sep. 30, 2008, which claims the benefit of European patent applications nos. 08154918.0 filed on Apr. 22, 2008 and Ser. No. 07/117,853.7 filed on Oct. 4, 2007, the entire content of each of which is expressly incorporated herein by reference thereto.

FIELD OF THE INVENTION

The present invention concerns an integrated heater for the heating of a liquid in a beverage preparation machine.

BACKGROUND ART

In-line heaters for heating circulating liquid, in particular water, using thick-film technology have been known for a number of years.

EP 0 485 211 discloses a heater for a water heater, shower, washing machine, dishwasher or kettle. The heater includes a vessel for heating liquid, and an electric heating element which is arranged to heat a portion of the vessel. The heating element incorporates a thick-film resistive heating circuit with a thermal fuse included in the thick-film. The document further discloses a triac-type power regulator mounted directly on the heating element that acts as a heat sinker for this triac. Also disclosed is the presence of a thermistor, a temperature sensor, formed on the thick film, a thermal fuse, a flow control valve to continuously adjust the flow rate through the heater, a flow control and a temperature control. These electrical components are connected to a control unit that can be remote or formed as part of the dielectric layer of the thick film at a location close to the inlet pipe where the heater's metal substrate is kept cool by incoming cold water.

DE 197 32 414 discloses a heater that has a metal through-flow passage with an inlet and an outlet and at least one thick film heating element for heating water that circulates in the passage. The thick film heating element extends between the inlet and outlet on the outer surface of the heater. The thick film heating element has a tapered cross-section continuously decreasing in size from the inlet to the outlet. The decreasing section of the thick film and the thus resulting decreasing heat transfer along the passage inhibits accumulation of scale at the end of the passage. The heater may include temperature sensors near the inlet or outlet in the form of thick-film elements. The same idea is disclosed in DE 103 22 034 which concerns a heater having a water circulation passage extending between an outer shell and an inner tube, the shell and/or the inner tube is covered with a thick-film heating element. The water circulation passage may be delimited by a helicoidal fin. The section of the water circulation passage and/or the heating power of the thick-film decrease along the direction of flow. The decreasing heat transfer along the tube is provided to avoid evaporation of water in the heater. The heater may incorporate at the shell or inner tube temperature sensors of the NTC or PTC type in thick-film technology. Another heater with a helicoidal heating conduit is disclosed in DE 197 37 694.

The use of thick-film and other resistive heater technology is also known for hot beverage preparation machines.

U.S. Pat. No. 5,943,472 discloses a water circulation system between a water reservoir and a hot water or vapor distribution chamber of an espresso machine. The circulation system includes a valve, metallic heating tube and pump that are connected together and to the reservoir via different silicone hoses, which are joined using clamping collars.

WO 01/54551 (in the name of the applicant) concerns a liquid heating module for use in a hot beverage machine, which comprises a hollow tube of metallic material and a cylindrical insert located inside the hollow tube. The module incorporates an electrical thick-film resistor on a first part of the outside of the tube for preheating liquid and another electrical resistor on a second part of the outside of the tube for adjusting the temperature of the preheated liquid flowing through the tube. A further electrical resistor for measuring the temperature is incorporated at the module's inlet or outlet. In an embodiment, the heating module is supplied with water via a pump and is connected at its outlet to a conduit for circulating heated water to a coffee extraction chamber.

WO 2004/006742 (in the name of the applicant) discloses a further tubular heating device for beverage preparation machines having a plurality of thick-film resistors that can be empowered in various configurations to adjust the heating. The heating device has an outer hollow metallic tube and an insert made of plastic, metallic or ceramic material. The insert has helicoidal grooves for guiding and circulating water between the outer tube and the insert. The insert may be hollow and may be used for a reversed flow of part of the hot water. U.S. Pat. No. 7,286,752 discloses a similar thick-film tubular heater with an internal helicoidal water circulation conduit.

SUMMARY OF THE INVENTION

A preferred object of the present invention is to simplify and improve the incorporation of the heating function in a liquid food or beverage preparation machine to facilitate and permit an increased automation of the assembly of the machine, reduce the manufacturing operations and costs and increase the reliability of the machine.

This object is in particular achieved by providing a heating system that integrates electrical and fluid connections without requiring any flexible and deformable cable or tubes, for guiding current or liquid, to connect the heating function to other functional units of the liquid food or beverage preparation machine, or at least to limit the number of such flexible connections.

Therefore, the present invention relates to an in-line heater for a liquid food or beverage preparation machine, in which liquid, such as water, is circulated through this heater and then guided into a brewing chamber for brewing a food or beverage ingredient supplied into this brewing chamber. This heater comprises: a body incorporating an inlet, an outlet and a heating chamber extending therebetween, the inlet, outlet and heating chamber forming together a rigid passage, in particular a free-flow passage, for guiding this liquid circulating through this body; and a heating means, in particular a thick-film, cooperating with the body for supplying heat into this heating chamber.

The body is normally made of a material that is thermally highly conductive and preferably has a low thermal inertia to avoid delay between the heat generation by the heating means and transmission of the generated heat to the liquid circulating in the body. The material of the body which separates the heating means and the liquid circulating in the chamber may be metallic or metal based, such as steel or copper.

The resistive heating means may include wires and/or thick-film(s). The thick-film technology is known in the art, as discussed above, and may use inks (like paste) that can be applied to a surface of the body and that can be made of quartz, metal, alumina or beryllium oxide. The thick-film is typically applied onto the outside surface of the body and is made of an electrically insulating coating, such as plastic or enamel painting, on the body, a layer of a resistive heating track on the insulating coating and optionally a further layer, such as a plastic layer, protecting the insulating coating and the resistive heating track.

In accordance with the invention, the heater body has an outer face arranged to delimit an upstream part of the brewing chamber, the rigid passage of the body extending into the brewing chamber. Hence, an outer part of the heater does not merely serve to confine the heating chamber but also to form part of the extraction chamber. It follows that instead of having to provide a heating element, a upstream part of the brewing chamber and a fluid connecting member therebetween, a single component appropriately shaped, combines all these functions reducing thereby significantly the number of parts, the number of assembly operations and the risk of failure due to improper handling of these parts and/or improper assembly of the beverage preparation machine.

Typically, the brewing chamber is arranged to contain a food or beverage ingredient, such as powder soup, ground coffee or tea optionally in a capsule or a pod, and has an upstream part into which hot liquid is injected for brewing the food or beverage ingredient containing in the chamber and a downstream part leading into an outlet for guiding the liquid food or beverage produced by brewing.

The heater body's outer face may include: one or more protruding walls to delimit the upstream part of a brewing chamber; and/or connecting means for mechanical connection to a member delimiting a downstream part of the brewing chamber.

In one embodiment, the heater's body comprises a generally tubular or prismatic outer member that is covered with this heating means, in particular a thin-wall tubular or prismatic outer member having a thermal inertia that is lower than aluminum, the generally tubular or prismatic outer member having optionally a base that forms this outer face of the body.

The body may be a thin-wall envelope and/or further include an inner core, in particular an insert, that delimits with the outer member the heating chamber, the inner core being optionally generally coextensive and/or generally concentric with respect to the tubular or prismatic outer member. The insert can be made of plastic, metal and/or ceramic material, such as PA, POM or steel. The insert may be fixed or rotatable, as for instance disclosed in EP 1 253 844 and EP 1 380 243.

The heating chamber can be generally helicoidal around the core, in particular a chamber formed by a generally helicoidal groove or flange around the core, as for instance disclosed in EP 1 380 243.

Especially when the body is used with its helicoidal heating chamber extending along a horizontal or low slope axis, the inner core can be generally eccentric with respect to the tubular or prismatic outer member. In this configuration, the chamber is arranged so that the size of its cross-section changes along the chamber, to increase the flow velocity in areas, usually upper areas, which might otherwise serve to capture bubbles, in particular vapor bubbles. The increased liquid velocity in these areas "washes" the bubbles down and away from this area with the fast flow of liquid in this area. To avoid overheating in such areas with reduced cross-section, the heating power may be reduced on the corresponding parts of the heater, for instance, by adjusting the resistive means on these parts.

One or more electric components may be secured on or in the body of the heater. The electric components can be selected from temperature sensors, thermal fuses, flow meters, resistive heaters, ammeters and electric power regulators and similar components. One or more electric components may be connected to a printed circuit board (PCB) arranged to control this heater and optionally control further functions, such as a pump or an electric interface, of a beverage preparation machine arranged to contain this heater. The electric components on the body may be discrete components mechanically connected to the body and/or integrated components, for instance formed directly into the resistive thick-film layer. Typically, thermal fuses and temperature sensors may be formed in thick-film technology together with the resistive heater.

To reduce the number of assembly operations, in particular human interventions during the manufacturing process, the number of flexible, deformable, electric cable connections may be reduced. In particular, the electric components can be rigidly connected to this printed circuit board, for instance via rigid connector pins or blades or rigid plug and socket members. In such a way, the electric components, in particular those which come into contact with the liquid circulation system such as the heater or even the pump, can be mounted automatically on the printed circuit board and then the board with the components is assembled (for instance clipped) automatically onto the liquid circulation system without any flexible, deformable electric connectors (e.g. cables) between the board and the liquid circulation system. Alternatively, the electric components may be automatically mounted in a first step at dedicated locations of the liquid circulation system and then, in a second step, the printed circuit board is assembled, for instance via an appropriate connector, to the electric components. It is also contemplated to assemble by welding the electric components to the liquid circulation system, in particular to the heater and/or to the printed circuit board.

Another aspect of the invention relates to an in-line heater for a liquid food or beverage preparation machine, in which liquid is circulated through this heater and then guided into a brewing chamber for brewing a food or beverage ingredient supplied into this brewing chamber. This heater comprises: a body incorporating an inlet, an outlet and a heating chamber extending therebetween, this inlet, outlet and heating chamber forming together a rigid passage for guiding this liquid circulating through this body; a heating means, in particular a resistive heating means such as a thick-film, cooperating with the body for supplying heat into this heating chamber; and one or more electric components, such as sensors, thermal fuses and/or electric power components, that are secured on or in the body and connected to a printed circuit board arranged to control this heater and optionally further functions of this liquid food or beverage preparation machine.

In accordance with the invention, one or more electric components are rigidly connected to this printed circuit board, in particular via rigid connector pins or blades or rigid plug and socket members. By avoiding the use of flexible, deformable cables, the number of operations during the assembly process is reduced, in particular the number of human interventions is reduced. Hence, the manufacturing and assembly costs are correspondingly reduced as well as the risks of failure due to human error. By avoiding flexible and deformable cable connections, automation of the assembly may be increased.

For instance, these electric components may comprise a power component, in particular a resistive heating means such as a thick-film, which is rigidly connected via a rigid electric power pin and a rigid power connector. This power connector has a socket for receiving the rigid electric pin, the rigid connector being resilient, in particular made of one or more spring blades, to allow displacements of the socket for self-positioning the socket around the pin and to secure electric contact between the pin and the connector.

Furthermore, one or more features described above may be conveniently combined with this in-line heater.

The invention also relates to an electric power connector, in particular for a heater as described above. The power connector comprises a pair of spaced apart feet for connection to a current supply circuit. Each foot is connected to a first rigid spring member, the first spring members being connected together via a second rigid spring member. The second member has a socket for receiving and securing a rigid electric pin. The first and second spring members are resiliently displaceable along different directions, in particular perpendicular directions, for self-positioning the socket with respect to said rigid electric pin and to provide an electric connection permitting passage of high current therethrough. At least one of the first spring members and the second spring member may be generally blade-shaped. The first spring members and the second spring member can be generally M-shaped so as to allow displacements of the socket along two directions substantially in a single plane.

A further aspect of the invention relates to an in-line heater for a liquid food or beverage preparation machine, in which liquid is circulated through this heater and then guided into a brewing chamber for brewing a food or beverage ingredient supplied into said brewing chamber. This heater comprises: a body having a generally tubular or prismatic outer member and an inner core that is generally coextensive with respect to the tubular or prismatic outer member, the tubular or prismatic outer member and the inner core delimiting together a generally helicoidal heating chamber extending therebetween and around the inner core; and a heating means, in particular a resistive heating means such as a thick-film, covering the tubular or prismatic outer member for supplying heat into said heating chamber.

According to the invention, the inner core is eccentric with respect to the tubular or prismatic outer member so that the helicoidal heating chamber has a variable cross-section around the inner core.

As mentioned above, especially when the body is used with its helicoidal heating chamber extending along a horizontal or low slope axis, providing an inner core that is eccentric with respect to the tubular or prismatic outer member leads to a chamber that is arranged so that its cross-section varies along its length, so as to increase the flow velocity in areas which might otherwise capture bubbles, in particular vapor bubbles. Thus, by providing an increased flow velocity in these areas, the bubbles are "washed" away therefrom by the fast flow of liquid. In such a manner, the relative positioning of the insert relative to the tubular or prismatic outer member solves the problem of bubble accumulation without having to include complex movable mechanical systems (e.g. a rotatable insert) that would push the bubbles out from the heater. Hence, providing a heater with an eccentric insert leads to a reduction of the number of parts and assembly operations and costs of manufacture.

One or more features described above may of course be conveniently combined with this in-line heater.

A yet further aspect of the invention relates to a liquid food or beverage preparation machine comprising a heater as described above. The machine may be suitable to prepare liquid food such as soup, tea and/or coffee by brewing a food or beverage ingredient that may optionally be contained in capsule or a pod.

Another aspect of the invention relates to a liquid food of beverage preparation machine, in particular as described above. The machine comprises: an electric supply circuit connectable to an electric power source; a heater powered by the electric supply circuit; and a thermal fuse device in thermal communication with the heater and associated with the electric supply circuit. The fuse device is arranged to interrupt the electric supply circuit from the power source when the heater exceeds a temperature limit.

In accordance with the invention, the thermal fuse device is reversible and comprises a switch for automatically interrupting the electric supply circuit when the heater exceeds this temperature limit. The switch is operable by a user to close the electric supply circuit when the heater has a temperature that has returned below said temperature limit. Typically, the fuse device comprises an actuator that is arranged to push out a pin, rod or piston against the user switch when this temperature limit is exceeded by the heater so as to actuate the user switch and open the circuit.

This beverage or liquid food machine may include any of the above disclosed features or combination of features.

The fuse device may have an actuator which comprises a thermo-mechanical component that is in thermal communication with the heater and that mechanically actuates the user switch to open the electric supply circuit when the heater exceeds the temperature limit. The thermo mechanical component comprises in particular a shape memory element or a bimetal element.

The fuse device can include a safety electric temperature sensor in thermal communication with the heater and an electromechanical actuator that actuates the user switch to open the electric supply circuit when the safety sensor is exposed to a temperature generated by the heater which exceeds the temperature limit.

In one embodiment, the beverage or liquid food machine has a printed circuit board with a control circuit for controlling the heater and optionally further functions of the machine, such as a pump or an electric interface, the printed circuit board further including a safety circuit that is electrically separated on the printed circuit board from the control circuit, the safety circuit being connected to the safety sensor, in particular rigidly connected to the safety sensor, and arranged to control the electromechanical actuator.

At least part of the fuse device, in particular the actuator, electromechanical or thermo-mechanical actuator, the user switch and/or, when present, the safety sensor, may be rigidly connected to a printed circuit board of the liquid food or beverage machine, optionally on a part that is electrically insulated from an ordinary control unit of the machine, e.g. a unit for controlling the usual operations of the machine such as beverage or liquid food dispensing, self-cleaning, user-interface, etc. Hence, assembly and integration and safety of the fuse device into the liquid food and beverage machine is improved.

BRIEF DESCRIPTION OF THE DRAWINGS

The invention will now be described with reference to the schematic drawings, wherein.

DETAILED DESCRIPTION

Figures 1, 2, 3:
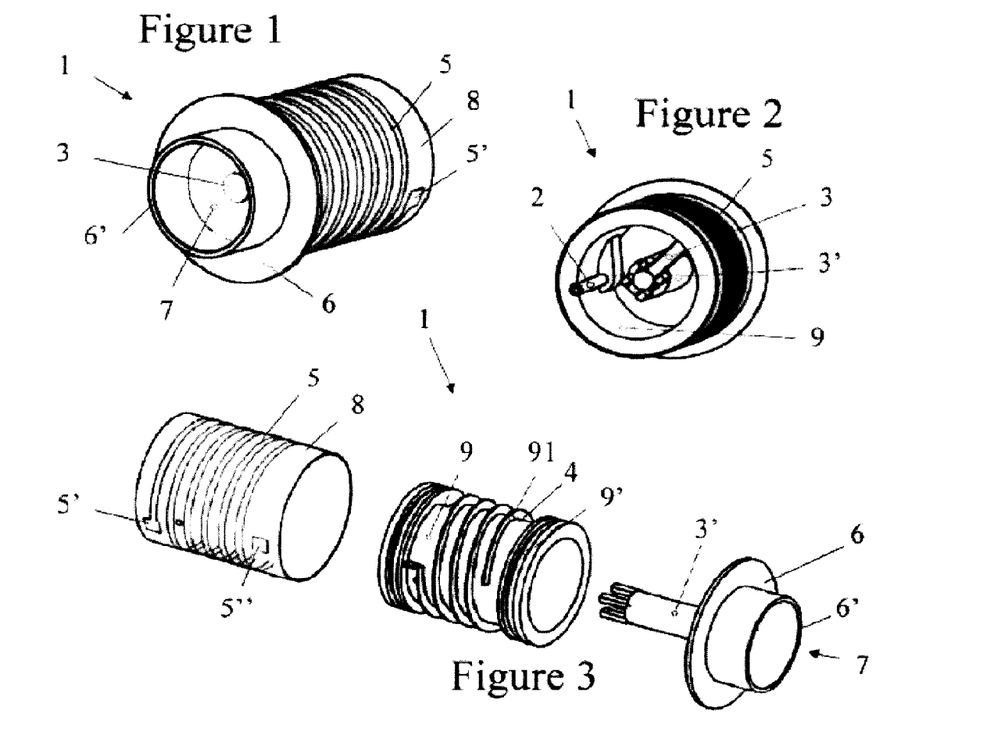
FIGS. 1 to 3 show various details of a heater according to the invention.

FIGS. 1 to 3 illustrate an in-line heater according to the invention, FIG. 1 being a front perspective of the heater, FIG. 2 being a rear perspective of this heater and FIG. 3 being an exploded view of the same heater. The heater is suitable for a liquid food or beverage preparation machine, in which liquid is circulated through a heater and then guided into a brewing chamber for brewing a food or beverage ingredient supplied into the brewing chamber. For instance, a beverage ingredient is supplied to the machine in prepackaged form, for example contained in a capsule or in a pod. Typically, this type of liquid food or beverage machine is suitable to prepare coffee, tea and/or other hot beverages or even soups and like food preparations. The pressure of the liquid circulated to the brewing chamber may for instance reach about 10 to 20 atm.

The heater has a body 1 incorporating an inlet 2, an outlet 3 and a helicoidal heating chamber 4 extending therebetween. Inlet 2, outlet 3 and heating chamber 4 forming together a rigid passage for guiding liquid circulating through body 1.

The heater further includes a heating means 5 in the form a resistive thick-film that extends as a helicoidal track between two connector areas 5',5" over body 1 and cooperates with the body for supplying heat into heating chamber 4 located underneath thick-film 5.

Heater body 1 has an outer face 6 arranged to delimit an upstream part of a brewing chamber 7, the rigid passage, in particular outlet 3, of body 1 extending into brewing chamber 7. As shown schematically in FIGS. 1 and 3, outer face 6 includes an annular protruding wall 6' for delimiting the upstream part of brewing chamber 7.

As illustrated in FIGS. 1 to 3, body 1 has a generally tubular outer member 8 that is covered with the heating means 5. Member 8 has a thin wall made of thermally highly conductive material and of low inertia, such as steel, to promote transfer of heat generated by the heating means 5 formed thereon. This generally tubular outer member 8 cooperates with a base member that forms the outer face 6 of body 1.

Outer face 6 is shown extending peripherally over the edge of tubular member 8. Moreover, annular wall 6' delimiting the upstream portion of brewing chamber 7, is generally coaxial with outlet 3 and has a diameter that is smaller than the diameter of tubular member 8.

Figure 6:
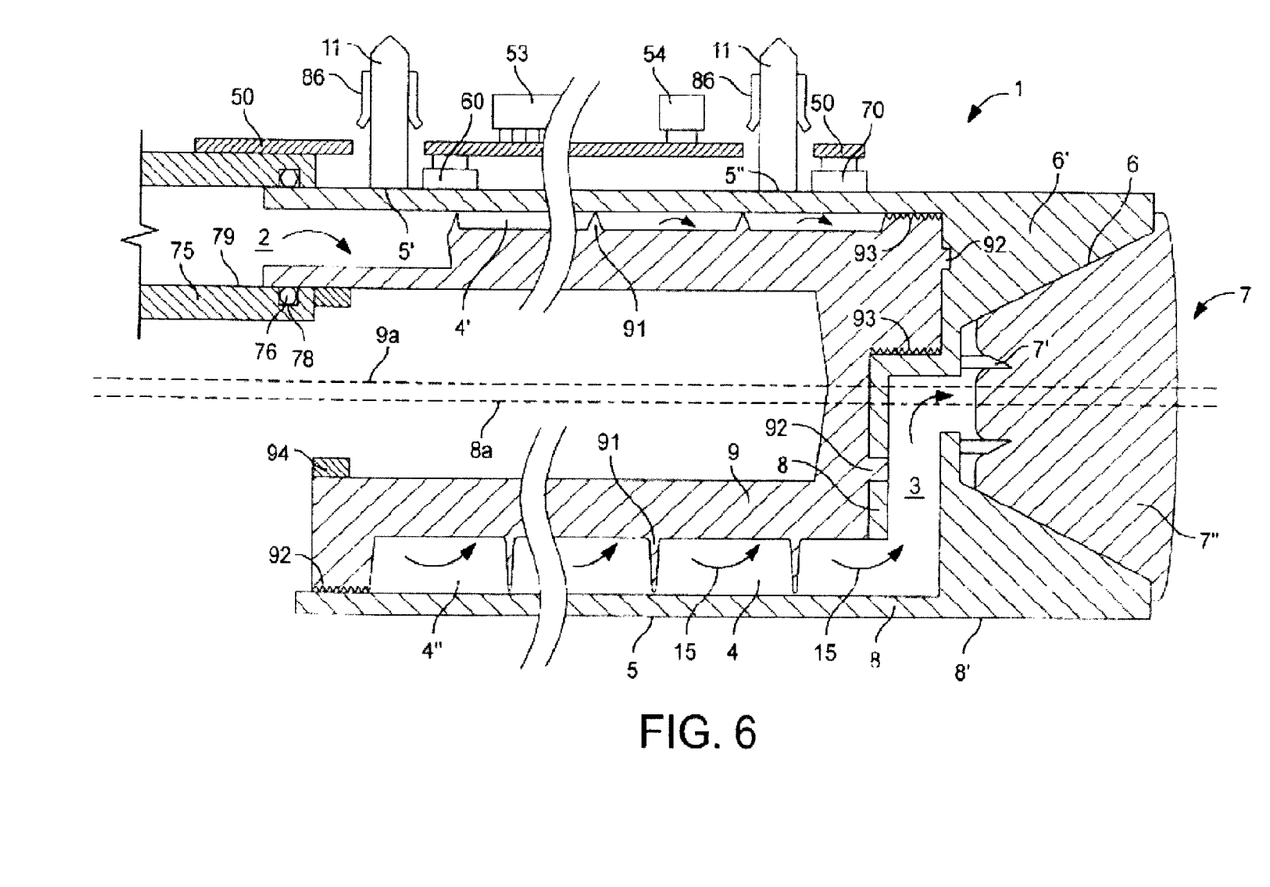
FIG. 6 shows yet another heater according to the invention.

In a variation, the upstream portion of brewing chamber 7 may be formed integrally with tubular member 8 and/or annular wall 6' may have an outermost surface that is co-extensive with the outer surface of tubular member 8 to further simplify its geometry. Such a configuration is shown in FIG. 6.

Body 1 of FIGS. 1 to 3 further includes an inner core 9, in particular a hollow tubular or cylindrical insert, with a peripheral protruding helicoidal guiding wall 91. Inner core 9 is generally coextensive and concentric with respect to tubular outer member 8, and delimits with outer member 8 helicoidal heating chamber 4. In a variation, a helicoidal groove may be provided around the inner core instead of the protruding guiding wall. The groove or wall may also be formed on the inner face of the tubular outer member. Inner core 9 may be made of metal or of a material that is less heat conductive such as plastic or ceramic material.

One or more electric components, such as sensors and/or electric power elements, are secured in body 1 in a housing 3' located around outlet 3. The electric components may include one or more of: temperature sensors, thermal fuses, flow meters, resistive heaters and electric power regulators.

Housing 3' and the therein contained electric components may be connected via rigid data transfer connectors to a printed circuit board (not shown).

In a variation, the electric components may be assembled into tubular outer member 8. In particular, the power element, for instance a triac, for adjusting the electric current passed via the resistive heating means 5 may be located in the heater close to the circulating liquid so that the circulating liquid may serve as a cooler for the power component.

Also shown in FIG. 3 is a sealing means 9' on insert 9 to prevent the leakage of liquid between tubular outer member 8 and insert 9. Sealing means 9' may be integral with tubular outer member 8 or insert 9 or a separate member 9' between member 8 and insert 9, such as an O-ring or another deformable seal, or a seam formed by welding.

Figures 4, 5:
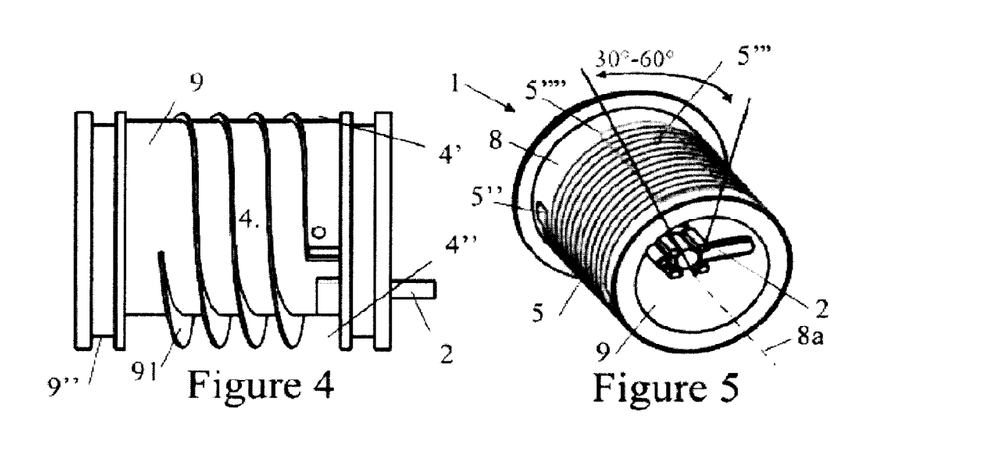
FIGS. 4 and 5 show another heater according to the invention.

FIGS. 4 and 5, in which the same numeric references designate the same elements show another heater according to the invention.

Heater body 1 has an inner core 9 which is generally coextensive and eccentric with respect to the tubular outer member 8. Hence, the helicoidal heating chamber 4 has variable cross-section around inner core 9. In particular, along one side of outer member 8 and insert 9, the cross-section 4' of heating chamber 4 is significantly smaller than the cross-section 4" along the opposite side of outer member 8 and insert 9.

Thus, when the heater is not used in a vertical position, i.e. in a position in which the longitudinal central axis 8a of outer member 8 is not vertical but horizontal or at an angle which does not allow spontaneous escape of bubbles from helicoidal chamber 4 to outlet 3. The increase of liquid velocity where the cross-section 4' of helicoidal chamber 4 narrows down permits to flush any bubbles contained in that upper area of chamber 4 to the lower area of chamber 4 with larger cross-sections 4", and so on until the bubbles reach outlet 3.

Furthermore, in order to avoid overheating and to inhibit the deposition of scale in the parts of chamber 4 with narrowed cross-sections 4', the heating power of heating means 5 may be reduced over a portion 5''' as indicated on FIG. 5 by the notional generally rectangular section 5'''' intercepting heating element 5 on tubular outer member 9. Portion 5'''' may extend along tubular outer member 9 over an arc of about 15 to 90°, in particular 30 to 60° of the tubular outer member 9, as measured from the central longitudinal axis 8a of tubular member 8.

FIG. 6, in which the same numeric references designate the same elements, schematically shows another embodiment of a heater according to the invention. The heater's body 1 has a generally tubular outer steel member 8 and an insert in the form of a generally tubular plastic hollow inner core 9 with a peripheral helicoidal flange 91 that delimits with an inner surface of member 8 a helicoidal heating chamber 4 extending between inlet 2 and outlet 3. Flange 91 extends to an inner surface of tubular outer member 8 and contributes to position and secure properly insert 9 within outer member 8. Like the heater shown in FIGS. 4 and 6, tubular outer member 8 and inner core 9 are eccentric, as shown by their respective central axis 8a and 9a that extend side-by-side and parallel to one another, so that heating chamber 4 has a variable cross-section 4',4" along its length as discussed above.

Tubular outer member 8 has a generally frusto-conical outer front face 6 formed by protruding walls 6' delimiting an upstream part of a brewing chamber 7 with piercing elements 7' for opening a capsule 7" containing an ingredient to be extracted, in particular a beverage or food ingredient. Outlet 3 extends through outer member 8 into the upstream part of brewing chamber 8.

As shown in FIG. 6, tubular outer member 8 has an outer surface 8' that extends substantially continuously over heating chamber 4',4" and the upstream part of brewing chamber 7. Tubular outer member 8 and frusto-conical brewing chamber 7 are concentric along axis 8a. The end of outlet 3 that leads into brewing chamber 7 is also concentric with outer member 8 along axis 8a.

Over heating chamber 4, outer surface 8' is covered with a resistive thick-film 5 as discussed above.

Tubular insert 9 is secured within tubular outer member 8, for instance by gluing, screwing, welding, force fitting or any other appropriate assembly means. As shown in FIG. 6, insert 9 has protrusions 92 that are fitted in corresponding recesses in tubular member 8. Furthermore, insert 9 has outer portions 93, for instance formed by small parallel side-by-side grooves or side-by-side protrusions, that my contain a bonding material such as glue and/or that may be compressed against outer member 8 to secure insert 9 therein. Insert 9 may also be urged and deformed in compression against inner surfaces of outer member 9 by using a structural element 94, in particular made of metal or ceramic material or another structural material that has a greater rigidity than insert 9, for instance in the form of a ring, that pushes a portion of insert 9 against outer member 8.

Inlet 2 is formed between outer member 8 and insert 9 and leads into heating chamber 4. In a variation, the inlet may be located only in the outer member or in the insert. Likewise, in a further variation, the outlet leading into the brewing chamber may exit from the insert or between the insert and the tubular outer member, instead of exiting from the tubular outer member 8 as shown in FIG. 6.

Furthermore, inlet 2 is connected to the rigid outlet of a flow meter 75. The flow meter's outlet is secured to inlet 2 by way of a water-tight joint 76, typically an O-ring located in a corresponding annular groove 78 extending along an inner face 79 of the flow meter's outlet. In a variation, a flow meter may be provided in or down stream the heating chamber, for instance at the outlet of the heating chamber, in particular integrated in the heater. Again, by providing rigid connections between the components, in particular between the heater and the flow meter, instead of flexible deformable connections, an overall increased automation of the manufacturing process of the system may be achieved.

The heater further comprises electric components 60,70 that are integrated, mechanically secured or rigidly assembled to heater body 1 and to a printed circuit board (PCB) 50, for instance as discussed below in greater details in connection with FIGS. 7 to 9. For example, electric component 60 may be a power component in the form of a triac for regulating the current supply to resistive thick-film heating element 5, and electric component 70 may be a temperature sensor for measuring the temperature of circulating liquid heated by the heater. Preferably, the heater also includes a thermal fuse as a protection to avoid overheating of the heater. These electric components may be discrete components or integrated components, in particular integrated into the thick-film heating element 5.

Furthermore, flow meter 75 and resistive heating means 5 are also rigidly connected to printed circuit board 50. In other words, they are electrically connected to printed circuit board 50 with a cableless connection. More specifically, power pins 11 are assembled to resistive heating means 5 at connector areas 5',5" and cooperate with socket 86 of a connector that is assembled to printed circuit board 50, for instance as discussed below in greater details in relation with FIGS. 11 to 13b.

Moreover, printed circuit board 50 is associated, with a micro-controller or processor 53 and a quartz clock 54 for controlling the intensity of current passed to resistive heating element 5 based on the flow rate of the circulating liquid measured with flow meter 75 and the temperature of the heated liquid measured with temperature sensor 70. To increase the accuracy of the temperature control, one or more further temperature sensors may be incorporated into the heater and/or brewing chamber, in particular upstream the heater or at the heater's inlet 2. Controller or processor 53 may also control further functions of a beverage preparation machine into which the heater is located, such as a pump, a liquid level detector in a supply reservoir, a valve, a user interface, a power management arrangement, an automatic beverage ingredient supplier such as an integrated coffee grinder or an automatic supplier of ingredient capsules or pods, etc.

During use, a liquid to be heated is circulated, for instance by using a pump, via flow meter 75 and inlet 2, helicoidally through heating chamber 4 around insert 9, as indicated by arched arrows 15. The heated liquid is then guided via outlet 3 into brewing chamber 7, along piercing elements 7' through capsule 7" for brewing the ingredient contained therein. Controller 53 is arranged to control triac 60 for adjusting the heating current passed via socket 86 and power pins 11 to heating element 5, based on measures of the liquid flow by means of flow-meter 75 and of the temperature of the heated liquid by means of temperature sensor 70.

Figure 7:
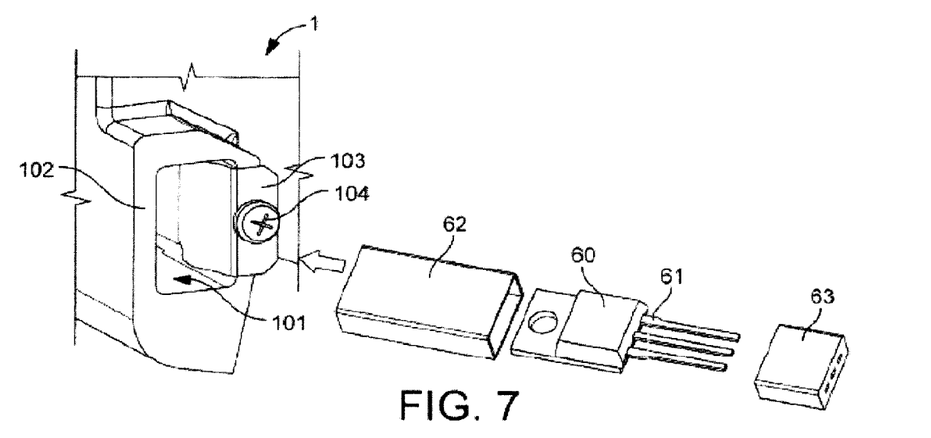
FIGS. 7 and 8 show the assembly of an electric power component to a heater and to a printed circuit board in accordance with the invention.
Figure 8:
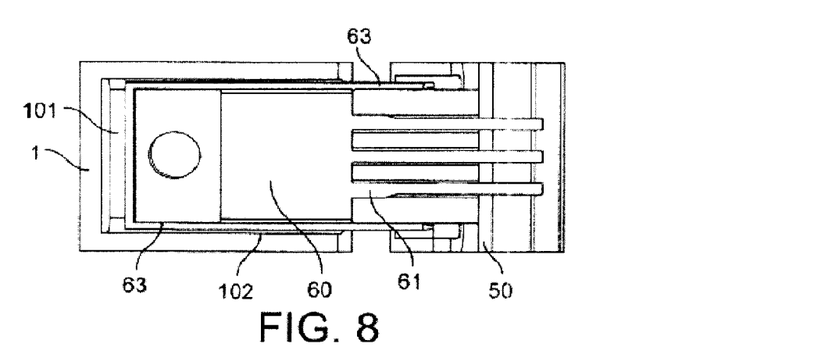

FIGS. 7 and 8 illustrate the assembly of a discrete power component in the form of a triac 60 to a heater body 1 and a printed circuit board 50 according to the invention. Whereas FIG. 7 shows the assembly in an exploded perspective view, FIG. 8 discloses the assembly in cross-section.

The heater body 1, a part of which is shown in FIGS. 7 and 8 has a recess 101 for receiving power component 60. Recess 101 formed between protruding walls 102 is associated with a spring element 103, for example in the shape of a spring leaf, assembled to body 1, e.g. via a screw 104. Other spring and assembly systems may of course be used, for example, the spring leaf may be integral with body 1 or welded thereto so as to reduce the number of parts. Spring element 103 urges power component 60 against walls 102 of recess 101 in body 1 when component 60 is inserted into recess 101, to secure component 60 in body 1 and provide an optimal contact between body 1 and component 60.

Power component 60 has one or more rigid electrical connector pins 61, for instance three pins for the triac shown in FIGS. 7 and 8, which are rigidly connected to printed circuit board 50. Furthermore, the power element is covered with an optional cap 62, e.g. made of silicon, that may assist fixation of the power component 50 in recess 101, as well as an optional non conductive sleeve 63 around its connector pins 61 which spaces the main body of power component 60 from printed circuit board 50 and protect pins 61 against the environment. Cap 62 and sleeve 63 provide an electric insulation around power component 60.

Hence, the heater serves as a heat sinker for power component 60 by evacuating, via heater body 1 and optionally via liquid circulating through the heater, heat generated by the power component during use. For this purpose, the heater is made of materials, in particular metal, that allows optimal evacuation of heat from the power component along the heat evacuation path through the heater.

Power component 60 may be a switch or regulating element, for instance a triac as mentioned above, to adjust the required electric power that is supplied to the resistive means, e.g. a thick-film, for generating the desired heat in the heater in order to heat the circulating liquid to the appropriate temperature.

Figure 9:
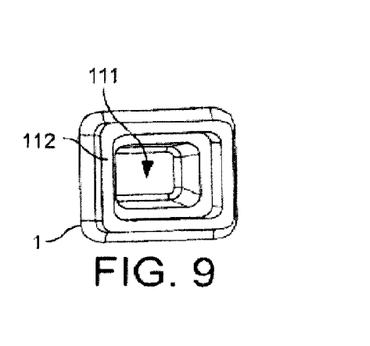
FIGS. 9 and 10 show the assembly of a sensor to a heater and to a printed circuit board in accordance with the invention.
Figure 10:
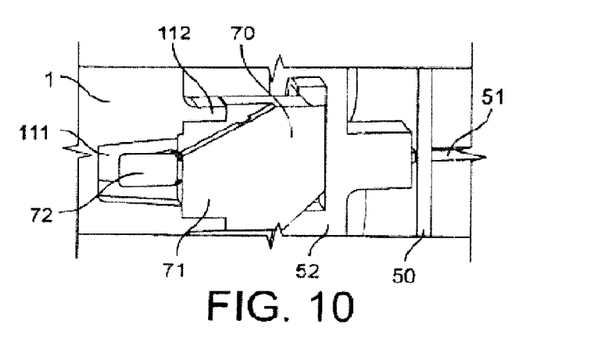

FIGS. 9 and 10 illustrate the rigid assembly of a discrete electronic component 70 into a heater 1 and to a printed circuit board 50. This electronic component may be a sensor such as a temperature sensor, a flow meter, a thermal fuse or another similar component, such as an ammeter for providing a feedback of the current passed through the resistive heating means. For the purpose of illustration, a thermal sensor for the control of current passed to the heating means and adjustment of the heat generated is disclosed. The thermal sensor may for example be located at the heater's inlet, outlet or inbetween. Several thermal sensors may be used to allow a more precise control of the heating of the liquid passed via the heater.

Heater body 1, a part or which is shown in FIGS. 9 and 10 has a recess 111 for receiving the electronic component 70. Recess 111 is formed between protruding walls 112 and extends below the surface of heater body 1.

Sensor 70 has a connector socket 71 through which a sensor element 72 is joined to electric flat connectors (not shown) on the opposite side of socket 71. The sensor's connection pins are brought into contact with flat connector pins 51, one of which is shown in FIG. 10, of printed circuit board 50. Pins 51 extend through a plug member 52 of board 50, to which connector socket 71 is mechanically connected, into socket 71 for contacting the corresponding connection pins of sensor 70. When connector socket 71 is urged between walls 112 of body 1, sensor element 72 is located in recess 111 of heater body 1.

When sensor 70 is a temperature sensor, the electric characteristics of sensor element 72 will depend on the temperature in recess 111, which will be used for evaluating the temperature of the heater at this location and optionally also the temperature of nearby circulating liquid in an indirect evaluation process.

Sensor element 72 may for instance be an NTC (negative temperature coefficient) resistor or a PTC (positive temperature coefficient) resistor.

Such a sensor configuration permits reliably measuring the temperature in the corresponding location of the heater, fast reaction (low inertia) and provides an excellent and reliable electric contact system.

Sensor 70 may be preassembled into socket 71, for instance made of thermoplastic material, and automatically assembled into a heater and to a printed circuit board in a fully automatic process. Sensor 70 may be glued into the heater using for example an epoxy compound. The preassembled sensor 70 may then be connected by pressing the socket's flat connectors into connection slots (not shown) of socket 71 in such a way as to be connected to sensor element 72. Printed circuit board 50 is then mounted onto socket 70 via plug 52 and connector pins 51.

It follows that the assembly itself of the heater and the printed circuit board does not require handling any flexible parts and thus the assembly can be carried automatically without the need of any human intervention. Furthermore, the assembly of the sensor itself only requires low cost components. Hence, the assembly of the sensor on a heater and its connection to a printed circuit board leads to significant cost savings.

In a variation, electric components such as temperature sensors may be directly formed in thick-film technology in the heater. This is particularly advantageous for reducing the manufacturing steps and costs when the heating means is based on thick-film technology.

Figure 11:
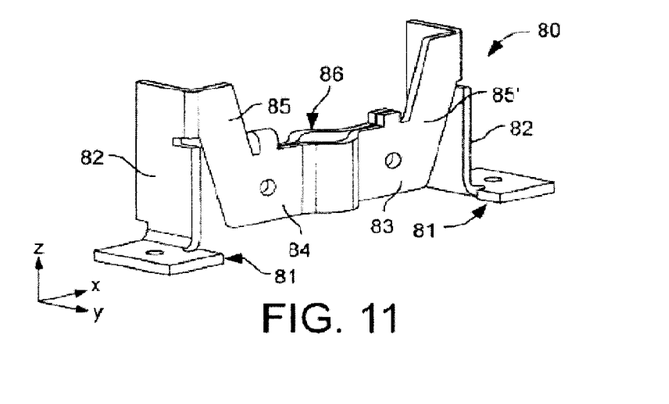
FIG. 11 shows an electric power connection between a heater and to a printed circuit board in accordance with the invention.

FIG. 11 is a perspective view in an xyz orthogonal referential, as indicated by the corresponding arrows associated with FIGS. 11 to 13b, of a self-positioning rigid electric power connector 80 for connecting a heater to a printed circuit board 50 and for carrying heating current to or from the heater's resistive heating means. FIGS. 12a and 12b on the one hand, and FIGS. 13a and 13b on the other hand, schematically show the self-positioning of power connector 80 in the y direction and the x direction, respectively.

Power connector 80 is typically metal-based, and may in particular contain steel, aluminium and/or copper alloys that provide sufficient electric conductivity, mechanical resistance and resilience.

Power connector 80 extends between a pair of flat feet 81 for connection to a printed circuit board 50. Each foot 81 is connected to a bottom part of a flat generally upright spring member 82. The upper parts of the upright spring blades 82 are connected together via a transverse spring member 83 that comprises a flat central horizontal part 84 inbetween a pair of inclined intermediate parts 85,85'. Upright members 82, intermediate part 84 and inclined parts 85,85' of transverse member 83 are in a general M arrangement on the pair of feet 81. Transverse member 83 further includes a socket 86 with a through-passage for securing therethrough an electric connector pin from the heater.

In FIGS. 12a, 12b, 13a and 13b, in which the same numeric references designate the same elements, a power connector 80 is schematically shown assembled via a power pin 11 onto a tubular outer member 8 of a heater body 1 with an inlet 2. Power pin 11 extends upright at the beginning of tubular outer member 8 and is connected to connection area of resistive heating means (not shown) extending over the tubular outer member 8, the other connection area of the resistive heating means being connected via a second power pin to a second power connector (not shown). Power pin 11 extends through and is secured in the through-passage of socket 86 of transverse member 83.

Feet 81 of power connector 80 are electrically connected and secured onto printed circuit board 50, for instance by rivets or welding 81' or any other suitable assembly means. Heater body 1 is located underneath printed circuit board 50 so that power pin 11 extends through board 50 via a through-opening 55 in board 50 to the other side of board 50 and is then secured in through-passage 86 of power connector 80. Continuous electrical connection between power pin 11 and transverse member 83 may be achieved by force-fitting or welding pin 11 in through-passage 86.

Power connector 80 allows for small positioning displacements of through-passage 86 in the x direction and y direction, with reference to the xyz referential associated with FIGS. 11 to 13b. Different directions of displacements are provided by the different orientations, in particular perpendicular orientations, of the resilient spring blade members 82,83, which permit displacements along corresponding directions.

Figure 12A:
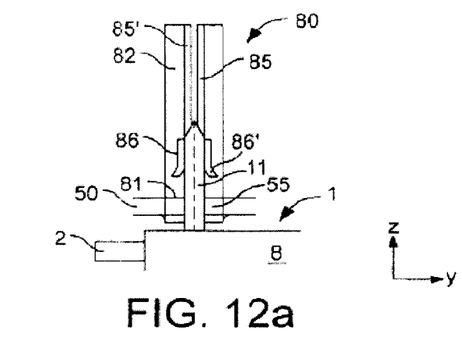
FIGS. 12a and 12b illustrate a deflection according to a first direction of the power connection shown in FIG. 11.
Figure 12B:
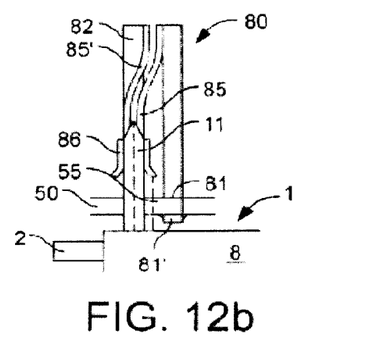
Figure 13A:
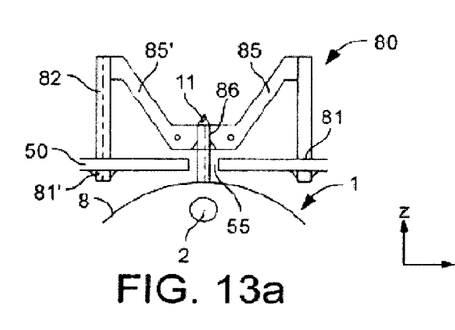
FIGS. 13a and 13b illustrate a deflection according to a second direction of the power connection shown in FIG. 11.
Figure 13B:
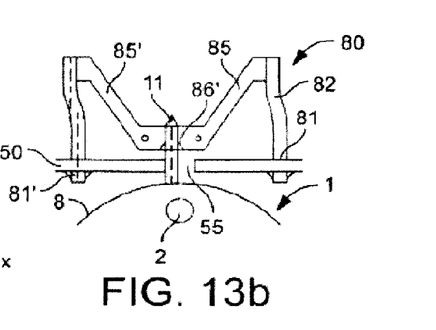

FIGS. 12*a* and 12*b*, on the one hand, and FIGS. 13*a* and 13*b*, on the other hand, show a displacement of the connector's socket 86 assembled to power pin 11 along the y direction and the x direction respectively. Displacement of socket 86 in the x and y directions is achieved by a small flexion of upright spring blades 82 and a small flexion of inclined intermediate parts 85,85', respectively.

FIGS. 12*a* and 13*a* show power pin 11 extending right through the middle of through-opening 55, and through the through-passage of socket 86 which all extend along substantially the same axis. In this configuration, power pin 11 is positioned in line with power connector 80 which is thus not subjected to any displacement flexion stress in its upright spring blades 82 and inclined intermediate parts 85,85'.

In contrast, FIGS. 12*b* and 13*b* show power pin 11 extending eccentrically through through-opening 55. Through-passage of socket 86 aligned to power pin 11 is equally eccentric with respect to through-opening 55. In this case, printed circuit board 50 is not perfectly aligned with power pin 11 of the heater and the power connector 80 self-adapts the position of its through-passage in socket 86 to match precisely the position of pin 11 by flexion of its upright spring blades 82 in the x direction, as shown in FIG. 13*b*, or by flexion of its transverse spring member 83 in the y direction, as shown in FIG. 12*b*. In order to facilitate insertion of power pin 11 into through-passage of socket 86, the lower part 86' of socket 86 has a generally funnel-like or frusto-conical shape that is arranged to receive a generally conical upper end of power pin 11.

The displacement of socket 86 to adapt to the position of power pin 11 may result from discrepancies, e.g. manufacturing tolerances or different temperature-related dilatation mechanisms, between the relative positioning of a pair of power connectors 80 on printed circuit board 50 with respect to the relative positioning of a corresponding pair of power pins 11 on the heater. Furthermore, the relative position of other electrical components that are rigidly connected to the printed circuit board and fixed parts of the beverage preparation machine, in particular the heater, for example temperature sensors and power regulator or switches, e.g. like the ones shown in FIGS. 7 to 10, may induce displacements at the level of the power connection.

During use, the passage of current via first power connector 80, first power pin 11, the resistive heating means (not shown), the second power pin (not shown), the second power connector (not shown) is controlled by a power switch or regulator, e.g. a triac, for instance as shown in FIGS. 7 and 8.

FIGS. 12*a* and 12*b* also illustrate how an error of relative positioning of feet 81 and inclined parts 85,85' on printed circuit board 50 is managed by power connector 80. As shown, feet 81 and thus inclined parts 85,85' are not perfectly aligned in the x direction but slightly off-set one to another. This off-set is however fully compensated by a corresponding resilient deflection of transverse member 83 without causing excessive stress in printed circuit board 50 or in power connector 80. Likewise, if the spacing between the two anchorage locations on printed circuit board 50 for anchoring feet 81 are greater or shorter than the spacing between feet 81 when the power connector is in a relaxed state, then a corresponding resilient deflection of members 82 can absorb such a spacing difference without excessive or detrimental stress in power connector 80 or printed circuit board 50.

Tests have shown that in the case of an M-shaped power connector of the type shown in FIGS. 11 to 13*b* having an overall width and height above the feet of about 1.3 cm×1 cm, made of bent blade-type conductive metal spring portions that have a cross-section of about 3 mm×0.2 mm or 0.3 mm, the positioning offset that can be tolerated and compensated in all directions while maintaining good electrical and mechanical contacts for currents above 10 amps and temperatures around 80° C., may be in the range of 3 to 8%, in particular about 5%, or 0.25 to 0.7 mm, typically around 0.4 mm.

Hence, with such power connectors allowing small displacements in one or more directions of its connection part 86 relative to its base 81 for connection to a board 50, small position tolerances of preassembled or preformed, e.g. by casting, heating element connectors can be compensated and still provide a good electrical contact performance under high current and elevated temperature conditions.

Therefore, with such a power connector 80 that self-positions its socket 86 on connector pins 11, it is possible to provide a cableless precise and continuous contact for high electrical currents, in particular between a resistive heating means on a heater and the power supply at printed circuit board 50. The absence of flexible power cables increases the integration, facilitates the manufacturing automation level of the device and reduces its production costs as well as its reliability by reducing the human factor.

Figure 14:
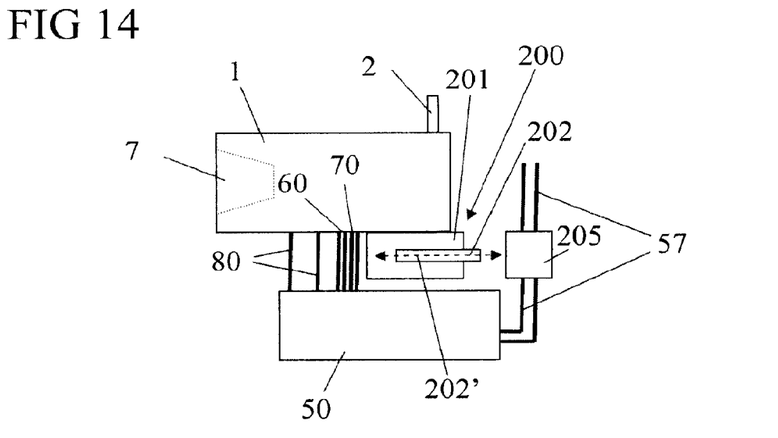
FIGS. 14 and 15 schematically illustrate two embodiments of the invention of an electric circuit of a beverage machine with a user-reversible safety fuse in accordance with the invention.
Figure 15:
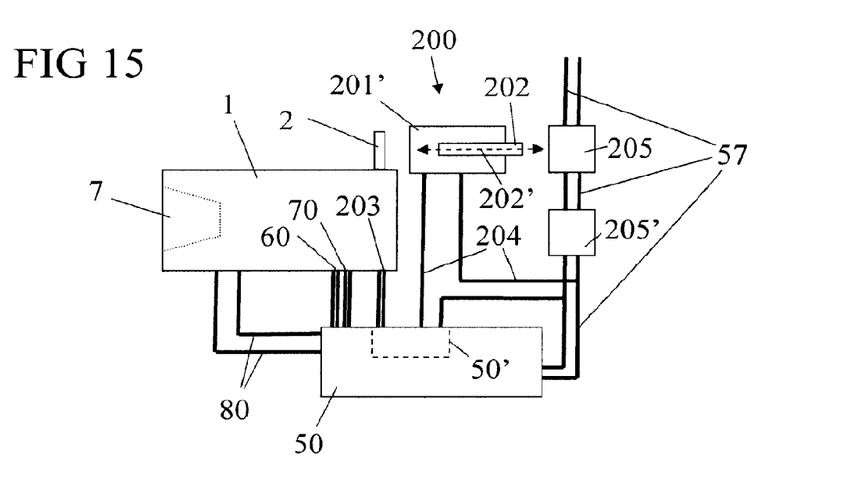

FIGS. 14 and 15, in which the same numeric references designate generally the same elements, schematically disclose two alternative embodiments of a beverage or liquid food machine with a user-reversible fuse device.

The machine according to the invention has an electric supply circuit 57 that is connectable to a power source (not shown), such as the mains or an equivalent power source. Supply circuit 57 is connected to a printed circuit board (PCB) 50 which bears the machine's control unit, e.g. a micro-controller, memory device, various interfaces to the various parts of the machine that require automatic control, such as a user-interface, a pump, a heater 1, sensors 60,70, etc. Supply circuit 57 has a main switch 205,205' allowing a user to switch on and off the beverage or liquid food machine.

Advantageously main switch 205,205' is mechanically mounted onto PCB 50 to facilitate assembly and increase integration of the system.

Furthermore, the machine includes a thermal fuse device 200 that has a switch 205 on circuit 57 and an actuator 201, 201' arranged to disconnect circuit 57 by actuating switch 205 when heater 1 has a temperature that exceeds a temperature limit, e.g. a temperature limit in the range of 120° C. to 180° C., in particular 140° C. to 160° C., indicative of a malfunction of heater 1 or of its control unit 50.

Thermal fuse device 200 is user reversible. Upon safety disconnection of circuit 57 by fuse device 200, switch 205 may be operated by a user to reconnect circuit 57 and re-establish electric powering of the PCB. Hence, if thermal fuse device 200 goes off improperly or if heater 1 merely has an accidental one time overheat condition, the liquid food or beverage machine of the invention does not need to be returned for servicing in order to replace the fuse device, unlike existing beverage or liquid food machines fitted with one time thermal fuses.

Fuse device 200 has an actuator 201,201' that is arranged to push out a pin, rod or piston 202 against the user switch, e.g. a switch of the push-button type, when said temperature limit is exceeded by the heater so as to actuate the user switch and open circuit 57.

The embodiment shown in FIG. 14 has a fuse device 200 with an actuator 201 including a pin 202 movable along the direction of arrow 202' and a thermo-mechanical component mounted onto heater 1 and in thermal communication therewith. The thermo-mechanical component may be any arrangement suitable to convert the passage of a temperature level into a mechanical action or displacement, such as an element made of a shape memory alloy that remembers its shape, or a bi-metal element.

Hence, when heater 1 exceeds the temperature limit, the thermo-mechanical component of actuator 201 is activated and will urge pin 202 against user switch 205. This will disconnect the electric parts of the machine from the power supply connected to circuit 57. When the heater's temperature drops below the temperature limit, the thermo-mechanical component will return back into its normal state and pin 202 will either follow the thermo-mechanical component or may be pushed back into its normal position by a user who actuates switch 205 to re-establish the power connection of the machine.

In the embodiment shown in FIG. 14, the user switch 205 cooperating with the thermal fuse may also serve as a main switch that may be operated independently of any over-heat situation in order to ordinarily switch on and off the beverage or liquid food machine.

Conversely, in the embodiment shown in FIG. 15, the user switch 205 cooperating with the thermal fuse is a dedicated switch separate from the main switch 205'.

Fuse device 200 comprises a safety electric temperature sensor 203 mechanically mounted against heater 1 and in thermal communication therewith. Furthermore, to simplify assembly and further integrate the electric components of the machine, temperature sensor 203 is rigidly connected to PCB 50 in a similar manner as discussed above. Temperature sensor 203 monitors the temperature of heater 1. In a less preferred embodiment, such a temperature sensor may also be connected by other means to the PCB, in particular in a partly or entirely flexible manner.

Temperature sensor 203 is associated with a control means that controls the electrical powering of actuator 201' via its connection circuit 204 depending on the measured temperature. For instance, the control means includes a power switch, e.g. a transistor, on connection circuit 204 connected to temperature sensor 203.

Advantageously, the temperature sensor 203, the power switch associated therewith, user switches 205 and even actuator 201' are rigidly mounted onto PCB 50. Preferably these components are mounted on a section 50' of PCB 50 that is electrically insulated from the ordinary control unit of the beverage and liquid food machine on PCB 50. Hence, by having substantially all the electronic and electrical parts on the same PCB 50 but arranged in two distinct electrical circuits, mechanical assembly of the components is facilitated and the safety of the machine is increased.

What is claimed is:

1. An in-line heater for a liquid food or beverage preparation machine, in which machine liquid is circulated through the heater and then guided into a brewing chamber for brewing a food or beverage ingredient supplied into said brewing chamber, such heater comprising:
   a body incorporating an inlet, an outlet and a heating chamber extending therebetween, with the inlet, outlet and heating chamber forming together a rigid passage for guiding the liquid circulating through the body;
   one or more electric components that are secured on or in the body and connected to a printed circuit board arranged to control the heater;
   wherein the one or more electric components are rigidly connected to the printed circuit board.

2. The heater of claim 1 wherein the one or more electric components are rigidly connected to the printed circuit board via rigid connector pins or blades.

3. The heater of claim 1 wherein the one or more electric components are rigidly connected to the printed circuit board via rigid plug and socket members.

4. The heater of claim 1, wherein the one or more electric components comprise at least one of sensors, thermal fuses or electric power components.

5. The heater of claim 1, wherein the one or more electric components comprise resistive heating means.

6. The heater of claim 1, wherein the liquid food or beverage preparation machine comprises at least one component selected from the group consisting of a pump, a liquid level detector in a supply reservoir, a valve, a user interface, a power management arrangement, an automatic beverage ingredient supplier including an integrated coffee grinder, and an automatic supplier of ingredient capsules or pods, and wherein the printed circuit board is arranged to control the at least one component of the liquid food or beverage preparation machine.

7. The heater of claim 1, wherein the one or more electric components comprise a power component which is rigidly connected via a rigid electric power pin and a rigid power connector that has a socket for receiving the rigid electric pin, the rigid connector being resilient to allow displacements of the socket for self-positioning the socket around the pin and to secure electric contact between the pin and the connector.

8. A liquid food or beverage preparation machine comprising a heater as defined in claim 1.

9. The machine of claim 8, for the preparation of a liquid food or beverage by brewing a food or beverage ingredient by circulating liquid through the heater and then guided into a brewing chamber for brewing a food or beverage ingredient supplied into the brewing chamber.

10. The machine of claim 9, for the preparation of soup, tea or coffee by brewing a food or beverage ingredient that is contained in capsule or a pod.

11. An inline heater for a liquid food or beverage preparation machine, in which machine liquid is circulated through the heater and then guided into a brewing chamber for brewing a food or beverage ingredient supplied into the brewing chamber, the heater comprising:
   a body incorporating an inlet, an outlet, and a heating chamber extending therebetween, with the inlet, outlet, and heating chamber forming together a rigid passage for guiding the liquid circulating through the body; and
   one or more electric components that are secured on or in the body and rigidly connected to a printed circuit board arranged to control the heater, wherein the one or more electric components comprise a power component which is rigidly connected via a rigid electric power pin and a rigid power connector that has a socket for receiving the rigid electric pin, the rigid connector being resilient to allow displacements of the socket for self-positioning the socket around the pin and to secure electric contact between the pin and the connector, and wherein the power component comprises a resistive heating means that includes a thick-film.

12. The heater of claim 11, wherein the rigid connector is made of one or more spring blades.

13. The heater of claim 11, wherein the power connector comprises a pair of spaced apart feet for connection to a current supply circuit, each foot being connected to a first rigid spring member, the first spring members being connected together via a second rigid spring member, the second member having a socket for receiving and securing a rigid electric pin, the first and second spring members being resiliently displaceable along different directions for self-positioning the socket with respect to the rigid electric pin and thus providing an electric connection permitting passage of high current therethrough.

14. The heater of claim 13, wherein at least one of the first spring members and the second spring member is generally blade-shaped.

15. The heater of claim 13, wherein at least one of the first spring members and the second spring member are generally M-shaped.

16. A liquid food or beverage preparation machine comprising:
- an in-line heater comprising (1) a body incorporating an inlet, an outlet, and a heating chamber extending therebetween, with the inlet, outlet, and heating chamber forming together a rigid passage for guiding a liquid circulating through the body, and (2) one or more electric components that are secured on or in the body and rigidly connected to a printed circuit board arranged to control the heater;
- an electric supply circuit connectable to an electric power source, the heater powered by the electric supply circuit; and
- a thermal fuse device in thermal communication with the heater and associated with the electric supply circuit, the fuse device being arranged to interrupt the electric supply circuit from the power source when the heater exceeds a temperature limit, wherein the thermal fuse device is reversible and comprises a switch for automatically interrupting the electric supply circuit when the heater exceeds the temperature limit, and the switch is operable by a user to close the electric supply circuit when the heater has a temperature that has returned below the temperature limit.

17. The machine of claim 16, wherein the fuse device comprises an actuator that is arranged to push out a pin, rod or piston against the user switch when said temperature limit is exceeded by the heater so as to actuate the user switch and open the circuit.

\* \* \* \* \*